United States Patent
Zhang et al.

(10) Patent No.: US 10,985,623 B2
(45) Date of Patent: Apr. 20, 2021

(54) ELECTRIC MOTOR AND ROTOR THEREOF

(71) Applicant: Johnson Electric International AG, Murten (CH)

(72) Inventors: Fang Zhang, Shenzhen (CN); Ruifeng Qin, Hong Kong (CN); Ning Sun, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 39 days.

(21) Appl. No.: 16/517,190

(22) Filed: Jul. 19, 2019

(65) Prior Publication Data

US 2020/0028392 A1    Jan. 23, 2020

(30) Foreign Application Priority Data

Jul. 20, 2018 (CN) .......................... 201810806336.5

(51) Int. Cl.
| | |
|---|---|
| *H02K 1/28* | (2006.01) |
| *H02K 1/27* | (2006.01) |
| *H02K 21/14* | (2006.01) |
| *H02K 1/30* | (2006.01) |

(52) U.S. Cl.
CPC ............... *H02K 1/278* (2013.01); *H02K 1/30* (2013.01); *H02K 21/14* (2013.01)

(58) Field of Classification Search
CPC ............ H02K 1/278; H02K 1/28; H02K 1/30; H02K 21/14
See application file for complete search history.

(56) References Cited

U.S. PATENT DOCUMENTS

| | | | | |
|---|---|---|---|---|
| 5,801,470 A | * | 9/1998 | Johnson | H02K 1/2733 310/156.27 |
| 6,452,301 B1 | * | 9/2002 | Van Dine | H02K 1/2773 310/156.12 |
| 7,687,957 B2 | * | 3/2010 | Ochiai | H02K 1/278 310/156.08 |
| 8,179,010 B2 | * | 5/2012 | Ogami | H02K 1/2766 310/156.53 |
| 9,024,495 B2 | * | 5/2015 | Brandau | H02K 1/278 310/156.08 |
| 2007/0114867 A1 | * | 5/2007 | Marioni | H02K 15/03 310/156.23 |
| 2007/0138891 A1 | * | 6/2007 | Hurst | H02K 1/278 310/156.28 |
| 2012/0001510 A1 | * | 1/2012 | Uni | H02K 1/278 310/156.28 |

* cited by examiner

*Primary Examiner* — Dang D Le
(74) *Attorney, Agent, or Firm* — Millman IP Inc.

(57) ABSTRACT

An electric motor and a rotor thereof are provided. The rotor includes a shaft, a housing, a rotor core fixed to the shaft and received in the housing, and a plurality of permanent magnets placed between an outer surface of the rotor core and an inner surface of the housing. The housing includes a metal skeleton and a holding frame integral with and molded to the metal skeleton.

12 Claims, 7 Drawing Sheets

ELECTRIC MOTOR AND ROTOR THEREOF

CROSS REFERENCE TO RELATED APPLICATIONS

This non-provisional patent application claims priority under 35 U.S.C. § 119(a) from Patent Application No. 201810806336.5 filed in The People's Republic of China on Jul. 20, 2018, the entire contents of which are hereby incorporated by reference.

FIELD OF THE INVENTION

This present disclosure relates to a rotor, particularly to a rotor with permanent magnets, and an electric motor employing the rotor.

BACKGROUND OF THE INVENTION

An existing rotor of an electric motor includes a rotor core and a plurality of permanent magnets fixed to an outer periphery of the rotor core by glue. Then, a non-magnetic housing may be mounted to the rotor core to surround the permanent magnets. For example, the rotor core and the permanent magnets are usually mounted with the non-magnetic housing to prevent the permanent magnets from dropping off or breaking, when the electric motor is applied to an electric power steering device.

However, using the glue to fix the permanent magnets to the rotor core has the following problems. On the one hand, the glue is liable to be unevenly coated on the contact surface between the rotor core and the permanent magnets, so it is difficult to ensure adhesion strength therebetween, and thus the radial positions of the permanent magnets is difficult to be ensured. On the other hand, the glue needs a high temperature curing process which takes a lot of time, resulting in low production efficiency.

SUMMARY

Thus, there a desire for a rotor, of which a plurality of permanent magnets can be fixed without using glue, and an electric motor employing the rotor.

According to one aspect, a rotor is provided, which includes a shaft, a housing, a rotor core fixed to the shaft and received in the housing, and a plurality of permanent magnets placed between an outer circumferential surface of the rotor core and an inner surface of the housing. The housing comprises a metal skeleton and a holding frame integral with and molded to the metal skeleton.

According to another aspect, an electric motor is provided, which includes a stator and the rotor described above.

In the embodiments of the present disclosure, the permanent magnets and the rotor core are directly fixed by the housing of the rotor, so the disadvantages caused by using glue can be avoided, and thus the production efficiency and the reliability of the rotor can be improved.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
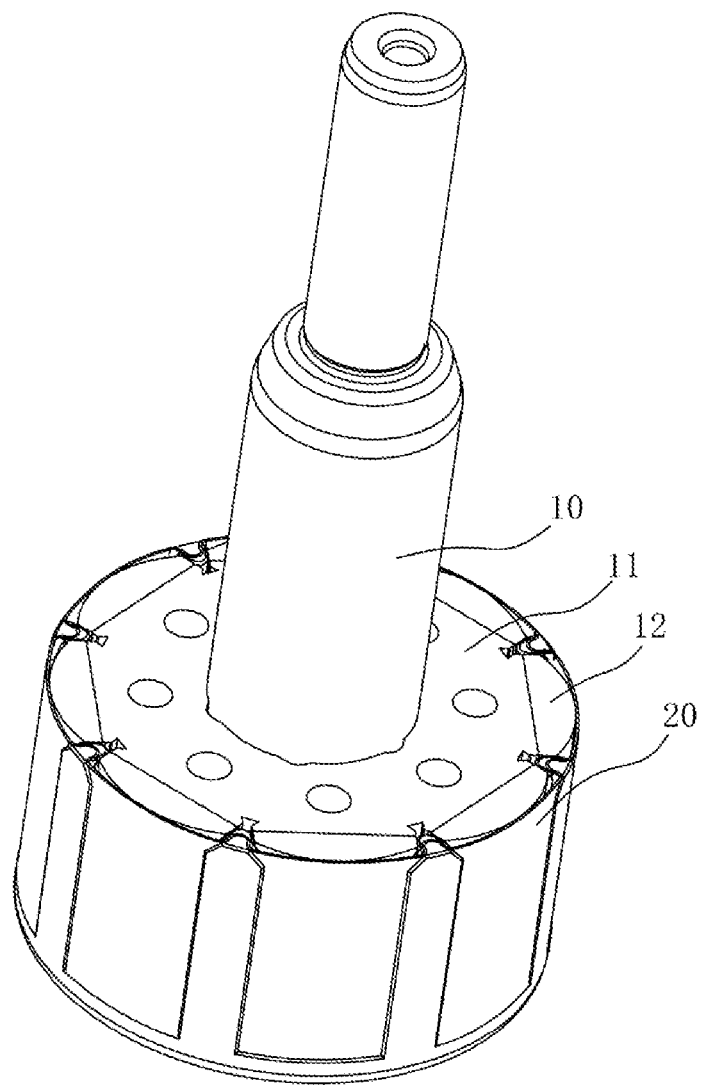
FIG. 1 is a schematic diagram of a rotor for an electric motor according to a preferable embodiment of the present disclosure.

The subject matter will be described in conjunction with the accompanying drawings and the preferred embodiments. The described embodiments are only a few and not all of the embodiments of the present disclosure. All other embodiments obtained by those ordinarily skilled in the art based on the embodiments of the present disclosure without any creative efforts fall within the protection scope of the present disclosure. It is to be understood that, the drawings are provided for reference only and are not intended to be limiting of the invention. The dimensions shown in the drawings are only for convenience of illustration and are not intended to be limiting.

It should be noted that when a component is considered to be "connected" to another component, it can be directly connected to another component or may also have a centered component. Unless otherwise defined, all technical and scientific terms used herein have the same meaning as commonly understood by those ordinarily skilled in the art. The terminology used in the specification of the present disclosure is only for the purpose of describing particular embodiments and is not intended to limit the invention.

Figure 2:
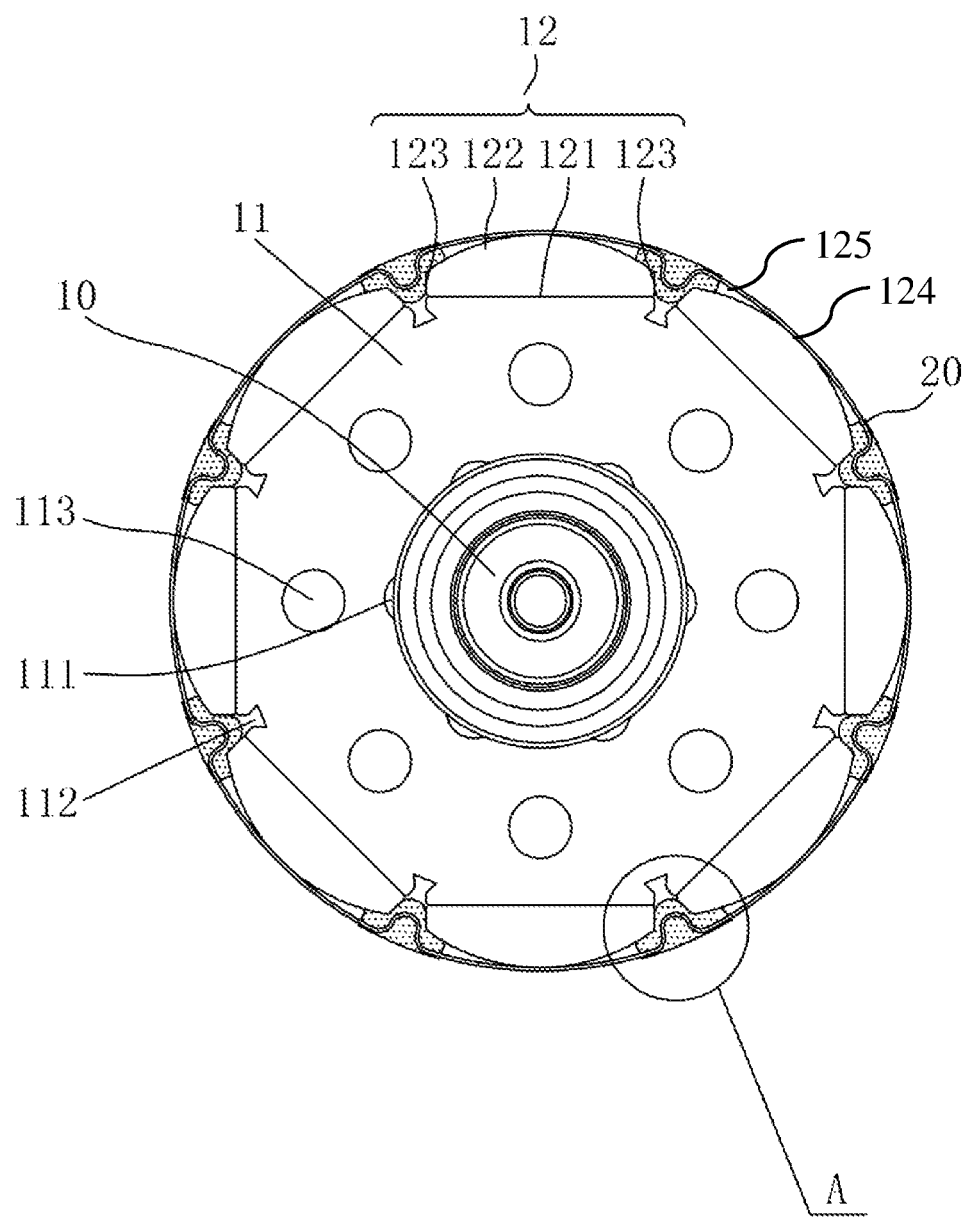
FIG. 2 is a sectional view of the rotor of FIG. 1.

Referring to FIGS. 1 to 2, a rotor of an electric motor according to a preferable embodiment of the present disclosure includes a shaft 10, a rotor core 11, a plurality of permanent magnets 12, and a housing 20. The rotor core 11 is fixed to the shaft 10. The housing 20 is substantially cylindrical. The permanent magnets 12 and the rotor core 11 are mounted into the housing 20. The permanent magnets 12 are placed between an outer circumferential surface of the rotor core 11 and an inner circumferential surface of the housing 20. The housing 20 is configured to protect the permanent magnets 12, preventing the permanent magnets 12 from dropping off or breaking and further falling into an air gap between the rotor and a stator of the electric motor.

The rotor core 11 and the permanent magnets 12 can be mounted into the housing 20 simultaneously or sequentially. Preferably, the rotor core 11 is mounted into the housing 20 first, and then the permanent magnets 12 are press fit between the outer circumferential surface of the rotor core 11 and the inner circumferential surface of the housing 20.

The rotor core 11 is formed by a plurality of laminations axially stacked together. In the embodiment, the cross section of the rotor core 11 is in a shape of a regular polygon, with a shaft hole 111 at the center of the rotor core 11 to allow passage of the shaft 10 therethrough. A plurality of slots 112 are respectively formed at the corners of the regular polygon.

The permanent magnets 12 may be made of neodymium iron boron or ferrite magnet. The permanent magnets 12 are formed as magnetic poles of the rotor core 11. Each permanent magnet 12 includes an inner surface 121, an outer surface 122 and two side surfaces 123 connected between the inner surface 121 and the outer surface 122. In the embodiment, the inner surface 121 is a flat surface in contact with the outer surface of the rotor core 11. The outer surface 122 is a convex curved surface. The permanent magnets 12 are placed at equal intervals in a circumferential direction of the rotor.

In the embodiment, the cross section of the rotor core 11 is in a shape of a regular octagon. The number of the permanent magnets is eight. In alternative embodiments, the number of the sides of the rotor core 11 and the number of the permanent magnet 12 can be adjusted according to the needs, such as 4, 6, 10, 12, and so on.

Figure 3:
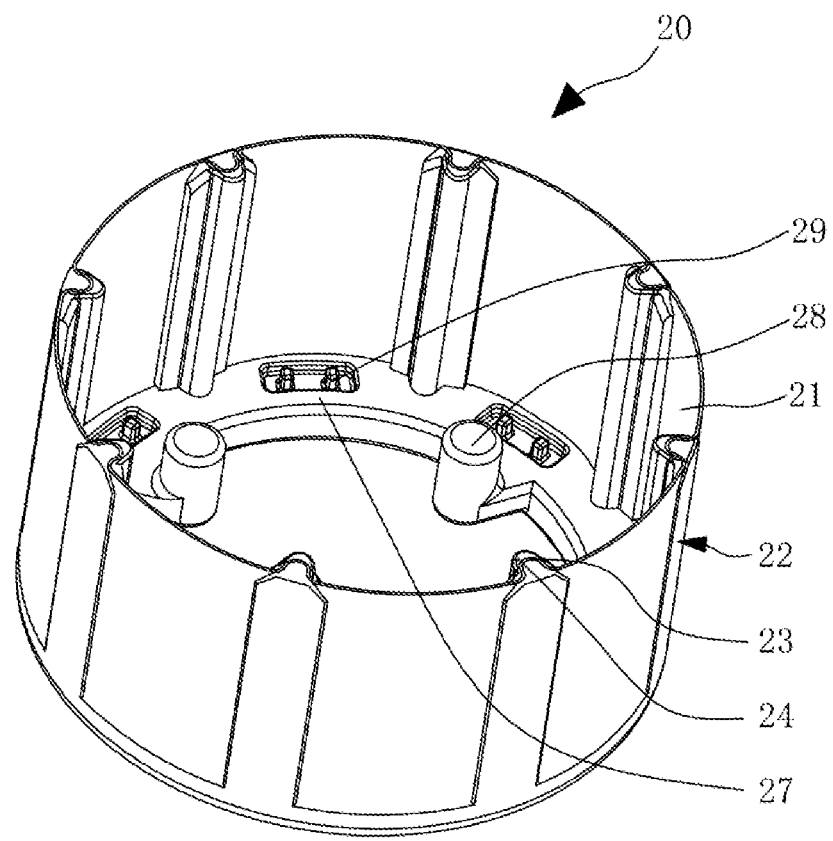
FIG. 3 is a schematic diagram of a housing of the rotor of FIG. 1.
Figure 4:
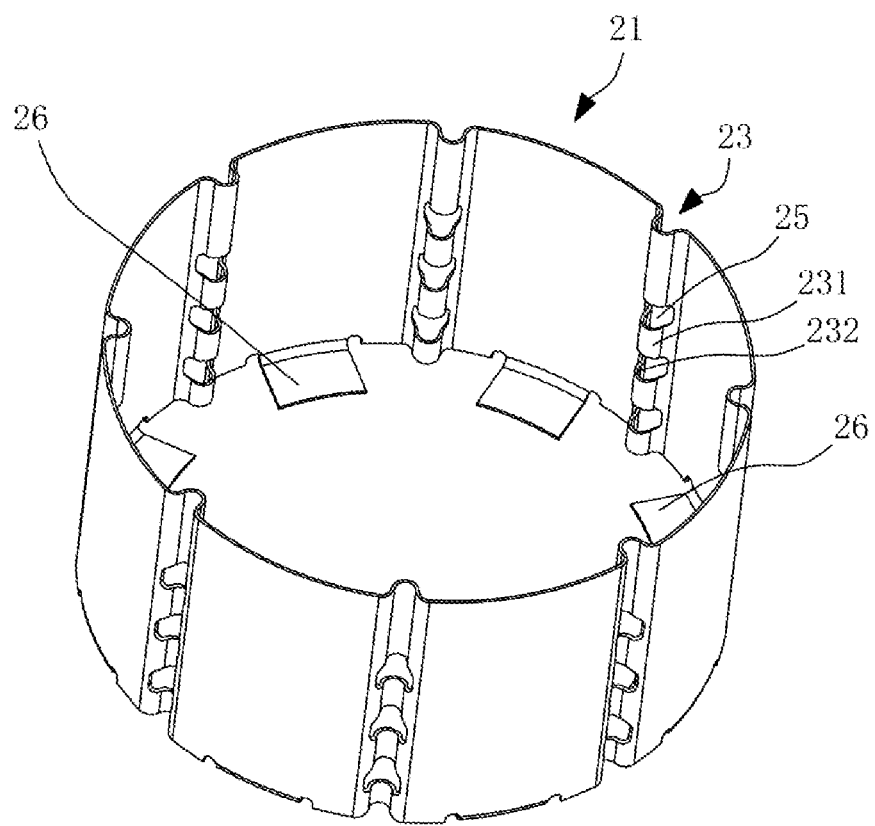
FIG. 4 is a schematic diagram of a metal skeleton of the housing of FIG. 3.

Referring to FIGS. 3 and 4, the housing 20 includes a metal skeleton 21 substantially cylindrical, and a holding frame 22. The holding frame 22 is molded to the metal skeleton 21, so it is integral with the metal skeleton 21. The holding frame 22 is preferably made of resin, for enhancing the strength of the metal skeleton 21. The metal skeleton 21 is made of non-magnetic metal, preferably non-magnetic steel, such as mild steel. The metal skeleton 21 has a thickness in the range of 0.2 mm to 1 mm, preferably in the range of 0.2 mm to 0.4 mm. The metal skeleton 21 may be directly formed by stamping, or may be formed by rolling a stamping sheet into a hollow cylinder. In alternative embodiments, the cross section of the metal skeleton 21 is not limited to a circle, and may be other shapes, for example, including a plurality of arcs with different centers, as long as the permanent magnets 12 can be fixed.

The holding frame 22 includes a plurality of axial holding portions 24 which extend along an axial direction of the rotor and are placed at equal intervals in the circumferential direction. The axial holding portions 24 are injection molded, preferably overmolded to partial region of the metal skeleton 21. The axial holding portion 24 may have an arc shaped cross section. Each permanent magnet 12 is fixed between two adjacent axial holding portions 24. The metal skeleton 21 may be formed with a plurality of openings 25. The axial holding portions 24 are partially embedded in the openings 25, to enhance the bonding strength with the metal skeleton 21.

The holding frame 22 further includes an annular support portion 27, which is connected to an axial end of the axial holding portions 24. The annular support portion 27 is placed at one axial end of the rotor core 11 and the permanent magnets 12, for supporting the rotor core 11 and the permanent magnets 12. The annular support portion 27 is provided with a plurality of positioning protrusions 28 extending along the axial direction. The rotor core 11 is formed with a plurality of positioning holes 113. Each positioning hole 113 is interference fit with the corresponding positioning protrusion 28, to ensure a fixation between the housing 20 and the rotor core 11.

Preferably, the electric motor further includes an annular end plate (not shown) made of injection molding material, which is corresponding to the annular support portion 27 and mounted to another axial side of the rotor core 11. Likewise, the annular end plate also may be provided with a plurality of axial extending position protrusions (not shown) which are interference fit with the positioning holes 113 of the rotor core 11, to ensure that the permanent magnets 12 are limited in the axial direction.

Figure 5:
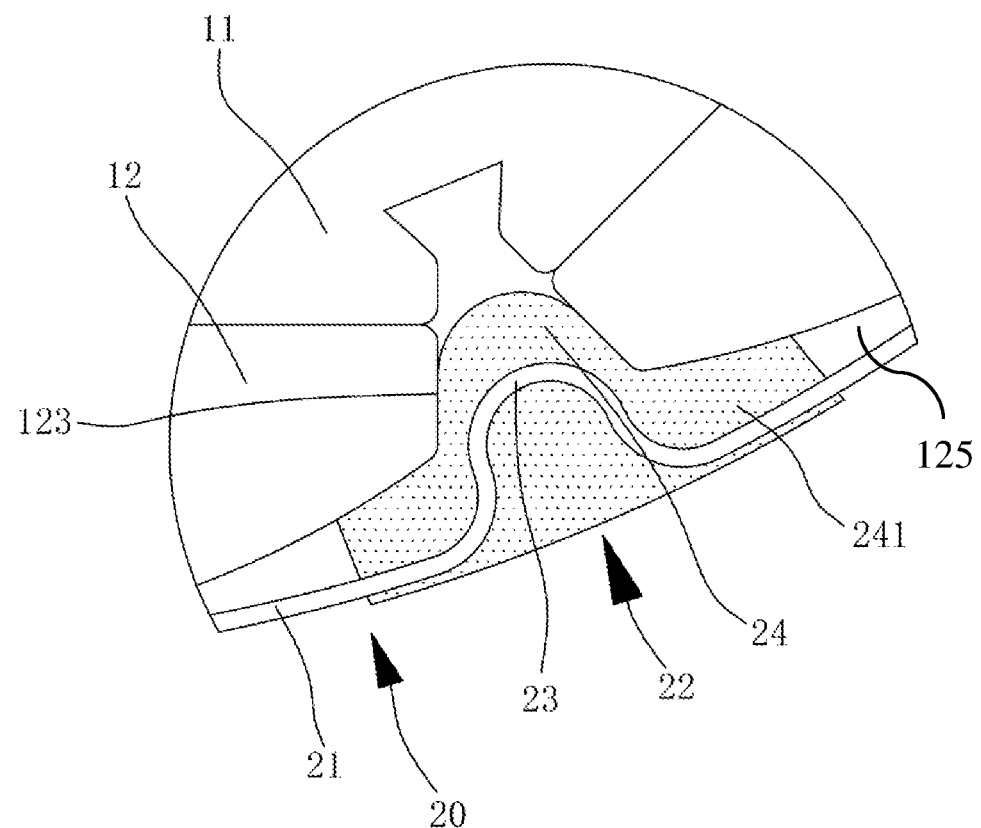
FIG. 5 is a partially enlarged view of FIG. 2 at portion A.

Referring to FIGS. 2, 3 and 5, when the rotor core 11 and the permanent magnets 12 are mounted into the housing 20, the permanent magnets 12 are fixed between the rotor core 11 and the housing 20. The holding frame 22 of the housing 22 shown in FIGS. 2 and 5 is filled with dot pattern, for a clear illustration. The axial holding portions 24 of the holding frame 22 bear against the side surfaces 123 of the permanent magnets 12 to limit a circumferential movement of the permanent magnets 12. An inner surface of the metal skeleton 21 bears against the outer surfaces 122 of the permanent magnets 12, to limit a radial movement of the permanent magnets 12.

The axial holding portion 24 of the holding frame 22 may further include two limiting portions 241, which respectively extend from two sides of the axial holding portion 24 toward opposite circumferential directions. The limiting portion 24 bears against a part of the outer surface 122 of the permanent magnet 12, for further fixing the permanent magnet 12.

Preferably, as shown in FIG. 2, the inner surface of the metal skeleton 21 has a curvature smaller than that of the outer surface 122 of the permanent magnet 12, so that the inner surface of the metal skeleton 21 only contacts a portion of the outer surface 122 of the permanent magnet 12. Consequently, the permanent magnets 12 are more easily press fit into the housing 20. Specifically, only the middle portion 124 of the outer surface 122 of the permanent magnet 12 bears against the inner surface of the metal skeleton 21. A gap 125 is formed between the outer surface 122 of the permanent magnet 12 and the inner surface of the metal skeleton 21 in the radial direction, and is formed between the axial holding portion 24 and the middle portion 124 of the outer surface of the permanent magnet 12 in the circumferential direction.

Preferably, the metal skeleton 21 includes a plurality of projections 23 placed at equal intervals in the circumferential direction. The projections 23 protrude radially inward and extend along the axial direction. The axial holding portions 24 of the holding frame 22 are injection molded to the corresponding projections 23. The aforementioned openings 25 are formed at the projections 23. In the embodiment, each projection 23 has three openings 25 arranged in the axial direction. Preferably, the axial holding portion 24 is overmolded onto the projections 23, surrounding a radially inner surface 231 and a radially outer surface 232 of the projection 23. The projection 23 may have an arc shaped cross section.

Preferably, the metal skeleton 21 further includes a plurality of end portions 26 arranged at intervals in the circumferential direction. Each end portion 26 extends radially inward from one axial end of the metal skeleton 21, and is arranged between two adjacent projections 23. In the embodiment, the end portion 26 is in the form of a sheet and can be integrally formed with the metal skeleton 21 during a stamping process. The annular support portion 27 of the holding frame 22 is overmolded to the end portions 26.

Preferably, an axial length of the permanent magnets 12 is less than an axial length of the rotor core 11. The annular support portion 27 has a plurality of supporting pins 29 beyond the surface of the annular support portion 27 in the axial direction. The supporting pins 29 are made of the same material as the holding frame 22, and are injection molded together with the holding frame 22 for supporting the permanent magnets 12.

In the embodiments of the present disclosure, the permanent magnets 12 and the rotor core 11 are directly fixed by the housing 20 of the rotor, so the disadvantages caused by using glue can be avoided, and thus the production efficiency and the reliability of the rotor can be improved.

Figure 6:
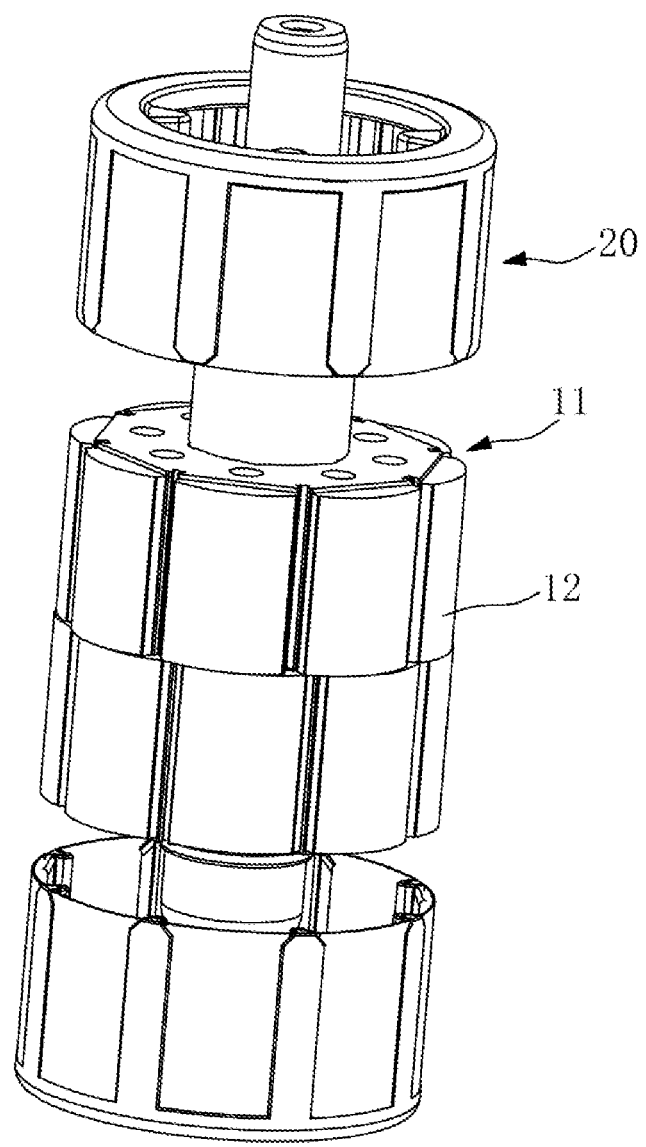
FIG. 6 is a partially exploded view of the rotor according to an alternative embodiment of the present disclosure.

FIG. 6 is a partially exploded view of the rotor according to an alternative embodiment of the present disclosure. The main difference between this rotor and the rotor shown in FIG. 1 is that, the rotor shown in FIG. 6 includes two aforementioned housings 20, respectively mounted to the rotor core 11 and the permanent magnets 12 from two axial ends of the rotor. Preferably, the rotor core 11 includes two parts arranged along the axial direction, which are offset from each other in the circumferential direction of the rotor. Correspondingly, the rotor includes two sets of permanent magnets 12. The two assembled housings 20 and the two sets of the permanent magnets 12 are also offset in the circumferential direction.

In alternative embodiments, the rotor core 11 may have only one part in the axial direction, or have a plurality of parts in the axial direction. When the rotor core have a plurality of parts in the axial direction, every two adjacent parts are offset from each other in the circumferential direction. Correspondingly, the rotor includes a plurality of housings 20 and a plurality sets of permanent magnets 12 received in the corresponding housings 20. The housings 20 on both axial sides may have the annular support portion 27, and the housing (not shown) therebetween does not have the annular support portion. The adjacent housings 20 and the adjacent sets of permanent magnets 12 are also offset in the circumferential direction.

Figure 7:
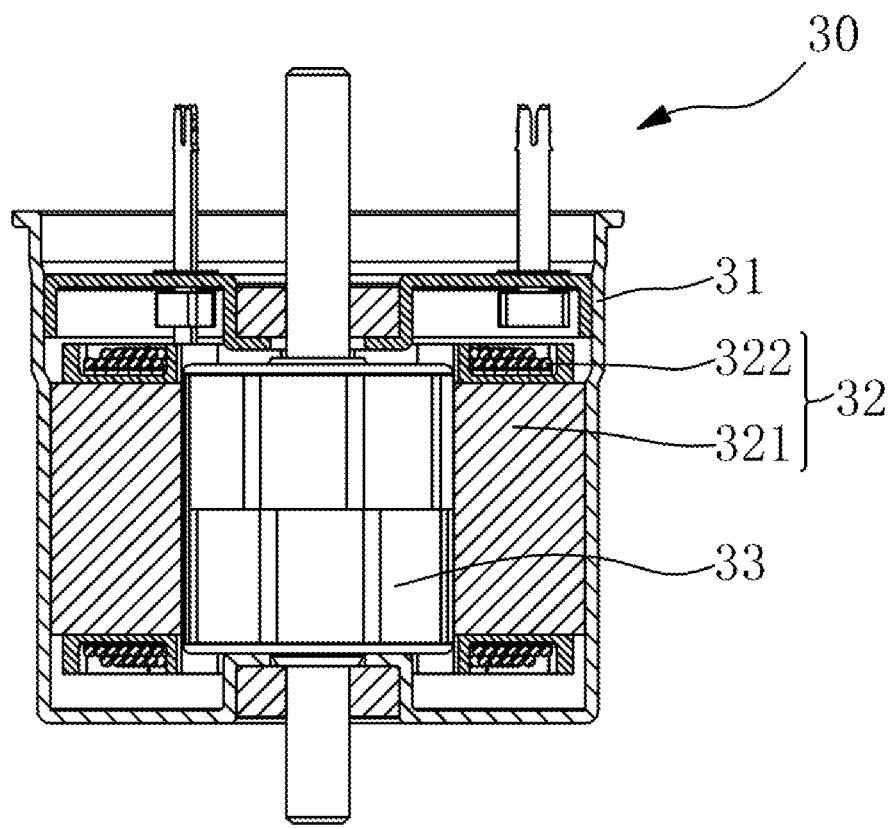
FIG. 7 is a schematic diagram of an electric motor according to a preferable embodiment of the present disclosure.

Referring to FIG. 7, the present disclosure further provides an electric motor, which includes a motor housing 21, a stator 32, and a rotor 33 described in any of the above embodiments. The electric motor is particularly suitable for systems that require a high safety performance, such as electric power steering systems, electronic brake systems, and so on. The stator 32 is fixed within the motor housing 31. The rotor 33 is rotatably disposed within the stator 31. The stator 32 includes a stator core 321 and a plurality of windings 322 wound around the stator core 321. The windings 322 generate a magnetic field after conducting a current, and then the permanent magnets 12 interact with a magnetic field generated by the windings 322, such that the rotor 33 rotates.

The above descriptions are only preferred embodiments of the present disclosure, and are not to limit the present disclosure. Any changes, equivalents, modifications and the like, which are made within the spirit and principle of the present disclosure, shall fall within the protection scope of the present disclosure.

The invention claimed is:

1. A rotor of an electric motor, comprising:
a shaft;
a housing;
a rotor core fixed to the shaft and received in the housing; and
a plurality of permanent magnets, placed between an outer surface of the rotor core and an inner surface of the housing;
wherein the housing comprises a metal skeleton and a holding frame integral with and molded to the metal skeleton.

2. The rotor according to claim 1, wherein the metal skeleton is substantially cylindrical, having an inner surface to bear against an outer surface of each permanent magnet, the holding frame comprises a plurality of axial holding portions arranged at intervals in a circumferential direction, and the axial holding portions are arranged between adjacent permanent magnets to bear against side surfaces of the permanent magnets.

3. The rotor according to claim 2, wherein the holding frame further comprises an annular support portion placed at one axial end of the rotor core, for supporting the rotor core and the permanent magnets.

4. The rotor according to claim 3, wherein a plurality of end portions extend radially inward from one axial end of the metal skeleton and are arranged at intervals in the circumferential direction, and the annular support portion of the holding frame is overmolded to the end portions.

5. The rotor according to claim 2, wherein the metal skeleton is made of non-magnetic metal.

6. The rotor according to claim 5, wherein the metal skeleton has a thickness in the range of 0.2 mm to 1 mm.

7. The rotor according to claim 2, wherein the inner surface of the metal skeleton has a curvature smaller than that of the outer surface of the permanent magnet.

8. The rotor according to claim 7, wherein a gap is formed between the outer surface of the permanent magnet and the inner surface of the metal skeleton in the radial direction, and is formed between the axial holding portion and a middle portion of the outer surface of the permanent magnet in the circumferential direction.

9. The rotor according to claim 2, wherein the holding frame includes two limiting portions, which respectively extend from two sides of the axial holding portion toward opposite circumferential directions and bear against the outer surfaces of the permanent magnets.

10. The rotor according to claim 2, wherein the metal skeleton includes a plurality of projections placed at intervals in the circumferential direction, the projections protrude radially inward and extend along the axial direction, and the axial holding portions are overmolded onto the corresponding projections.

11. The rotor according to claim 10, wherein the projections have a plurality of openings, and the axial holding portions are partially embedded in the openings.

12. An electric motor, comprising:
a stator;
a rotor, comprising:
a shaft;
a housing;
a rotor core fixed to the shaft and received in the housing; and
a plurality of permanent magnets, placed between an outer circumferential surface of the rotor core and an inner surface of the housing;
wherein the housing comprises a metal skeleton and a holding frame integral with and molded to the metal skeleton.

* * * * *